Patented Apr. 18, 1933

1,904,822

UNITED STATES PATENT OFFICE

RAINALD BRIGHTMAN, OF MANCHESTER, ENGLAND, ASSIGNOR TO IMPERIAL CHEMICAL INDUSTRIES LIMITED, OF WESTMINSTER, ENGLAND

AZO DYESTUFFS AND METHOD OF PREPARING SAME

No Drawing. Application filed August 7, 1930, Serial No. 473,764, and in Great Britain August 26, 1929.

The present invention relates to the manufacture and application of new azo dyes, particularly adapted for the dyeing of regenerated cellulose silk, for example, viscose silk, in even shades.

According to the invention new disazo dyes which have the valuable property of dyeing regenerated cellulose silk in even shades are obtained by coupling the product of diazotization of a p-aminoazo compound with 1-amino-5-naphthol-7-sulphonic acid or an N-substituted derivative thereof. In the term p-aminoazo compound I include any compound containing the azo group —N—N—, and the amino group. NH$_2$ situate in the p- or 4-position thereto, such as may be obtained, for example, by coupling a diazotized aromatic amine, or a homologue or derivative thereof, with a suitable coupling component containing an amino group. The amino-azo compound may contain, it will be understood, substituent groups, which may be introduced before or after the components are coupled.

The new dyes may be illustrated by the general formula:

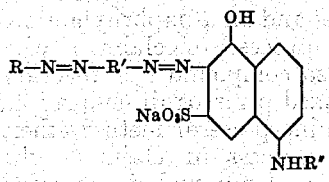

in which R and R' represent aromatic organic radicals of the benzene or naphthalene series, and R'' represents hydrogen or an organic radical.

By the invention I obtain dyestuffs giving in general violet to blue shades, and the new dyestuffs are thus particularly valuable, because the number of dyestuffs by the use of which regenerated cellulose silks may be dyed in even shades in this color range is very restricted.

The invention is illustrated by the following examples, to which however it is not limited. The parts are by weight.

Example 1

239 parts of 1-amino-5-naphthol-7-sulphonic acid are dissolved in water with about 500 parts of sodium carbonate. The solution is cooled with ice and there is run in while stirring the diazo-suspension obtained in the known manner by diazotizing the aminoazo dyestuffs prepared by coupling 93 parts of diazotized aniline with 223 parts of a technical mixture of α-naphthylamine-6- and 7-sulphonic acids in the usual way. The mixture is maintained alkaline and stirred until coupling is complete when it is heated up and the dyestuffs isolated by the addition of common salt. It dyes viscose silk a greenish blue shade.

It probably has the following formula:

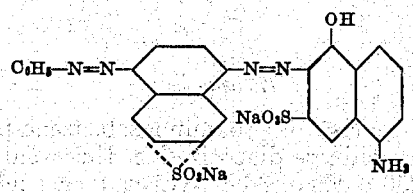

Example 2

153 parts of aminosalicylic acid obtained on reduction of a technical mixture of nitrosalicylic acids are diazotized and combined in the usual way with 143 parts of α-naphthylamine. The resulting aminoazo compound is diazotized with 69 parts of sodium nitrite and 250 parts of 36% hydrochloric acid in the known manner and the suspension of diazo-azo compound is slowly added to a cold well stirred solution of 1-benzoylamino-5-naphthol-7-sulphonic acid, which is kept faintly alkaline with sodium carbonate throughout the coupling. When combination is complete the mixture is heated up and the dyestuff isolated by the addition of common salt. It dyes viscose silk a navy blue shade.

It probably has the following formula:

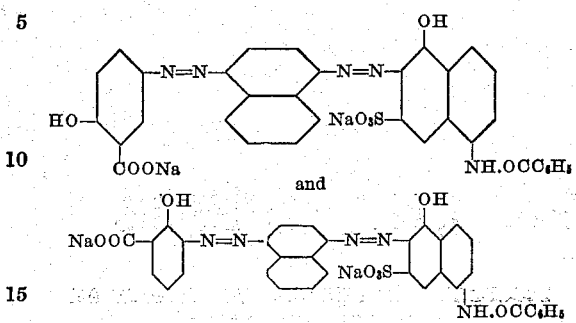

Example 3

The aminoazo dyestuff obtained by diazotizing 218 parts of para-nitroaniline-o-sulphonic acid and coupling with 137 parts of m-amino-p-cresol methyl ether is diazotized according to the known manner with about 69 parts of sodium nitrite and 300 parts of 36% hydrochloric acid and the suspension so obtained is stirred into a cold solution of 239 parts of 1-amino-5-naphthol-7-sulphonic acid containing about 400 parts of sodium carbonate. The mixture which is maintained alkaline throughout is stirred until coupling is complete and is then heated up and the dyestuff isolated by the addition of common salt. It dyes viscose silk a greenish blue shade.

It probably has the following formula:

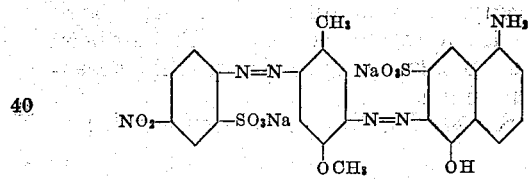

Example 4

277 parts of p-aminoazobenzene-p-sulphonic acid are diazotized in the usual way with 250 parts of 36% hydrochloric acid and 69 parts of sodium nitrite. The suspension of diazo compound is run into a cold well stirred solution containing 261 parts of sodium 1-amino-5-naphthol-7-sulphonate and 400 parts of sodium carbonate. The mixture is stirred until coupling is complete and is then heated up and the dyestuff isolated by the addition of common salt. It dyes viscose silk a violet brown shade.

It probably has the following formula:

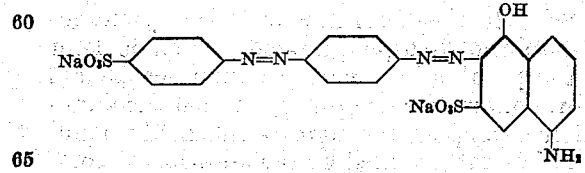

The invention is further illustrated by the examples in the following table:

| Aminoazo compound diazotized | Coupled with | Shade on viscose silk |
|---|---|---|
| p-Nitroaniline->Cleves acid | 1-amino-5-naphthol-7-sulphonic acid. | Navy blue |
| 2-naphthylamine-4:8->disulphonic acid m-amino-p-cresol-methyl ether. | Do. | Navy blue |

It will be understood that, while the formulas given herein in all probability correctly represent the dyes of the present invention, the invention is wholly independent of the correctness of such formulas.

As many apparently widely different embodiments of this invention may be made without departing from the spirit thereof, it is to be understood that I do not limit myself to the foregoing examples or descriptions except as indicated in the following patent claims.

I claim:

1. The process of preparing a disazo dyestuff which comprises coupling the product of diazotization of a p-aminoazo compound of the benzene and naphthalene series with an amino-naphthol-sulfonic acid of the general formula

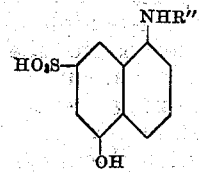

in which R" represents hydrogen or a radical of the benzene series.

2. The process of preparing a disazo dyestuff which comprises coupling the product of diazotization of a p-aminoazo compound of the benzene and naphthalene series with a 1-amino-5-naphthol-7-sulphonic acid.

3. The process of claim 1 wherein the p-aminoazo compound is a reaction product of a diazotized amino compound of the benzene series and an α-naphthylamine.

4. The process of claim 1 wherein the p-aminoazo compound is a reaction product of diazotized p-nitroaniline-o-sulphonic acid and m-amino-p-cresol methyl ether.

5. The process of claim 1 wherein the p-aminoazo compound is p-aminoazo-benzene-p-sulphonic acid.

6. A dyestuff having the general formula:

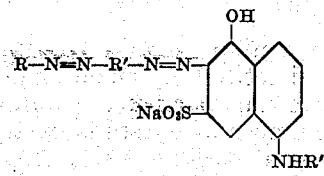

in which R and R' represent aromatic organic radicals of the benzene or naphthalene series, and R'' represents hydrogen or a radical of the benzene series.

7. A disazo dyestuff prepared by coupling the product of diazotization of a p-aminoazo compound of the benzene and naphthalene series with an amino-naphthol-sulphonic acid of the general formula

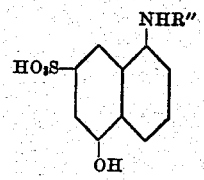

in which R'' represents hydrogen or a radical of the benzene series.

In testimony whereof, I affix my signature.

RAINALD BRIGHTMAN.